(12) United States Patent
Lin

(10) Patent No.: US 6,218,808 B1
(45) Date of Patent: Apr. 17, 2001

(54) MICRO-PEAK DETECTION QUICK CHARGER

(75) Inventor: Zhiping Lin, Kearny, NJ (US)

(73) Assignee: Model Rectifier Corporation, Edison, NJ (US)

( * ) Notice: Subject to any disclaimer, the term of this patent is extended or adjusted under 35 U.S.C. 154(b) by 0 days.

(21) Appl. No.: 09/534,022

(22) Filed: Mar. 24, 2000

(51) Int. Cl.$^7$ ........................................ H02J 7/00
(52) U.S. Cl. ............................................. 320/125
(58) Field of Search ............................... 324/125

Primary Examiner—Peter S. Wong
Assistant Examiner—Pia Tibbits

(74) Attorney, Agent, or Firm—Jonathan Grant; Grant Patent Services

(57) ABSTRACT

An apparatus and method for fast battery charging are provided. A fast battery charger applies high charging current to a battery to minimize charging time. Micropeak detection of the battery voltage prevents overcharging of the battery cells, thereby preventing degradation of battery capacity over time. Noise reduction throughout the system as well as improved detection resolution allows for micropeak detection. A linear power supply eliminates switch noise. The sampling frequency is synchronized with the power supply, eliminating error due to power supply variation. Sleeping sampling is performed to overcome noise due to operation of the CPU. Improved measurement resolution is obtained via a 10-bit analog to digital converter. A subtraction technique maintains the high measurement resolution. Digital signal processing filters out noise providing for a more accurate voltage measurement

16 Claims, 2 Drawing Sheets

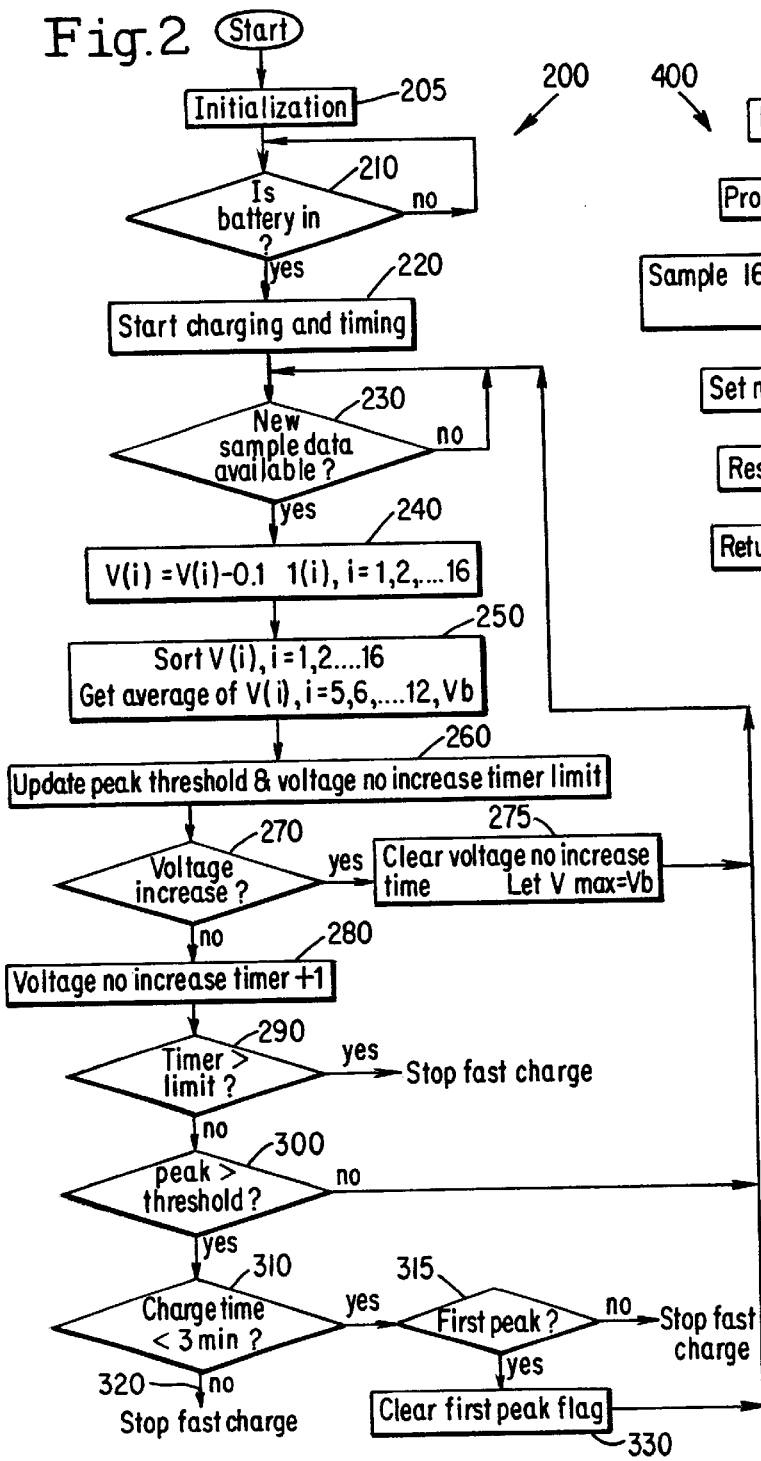
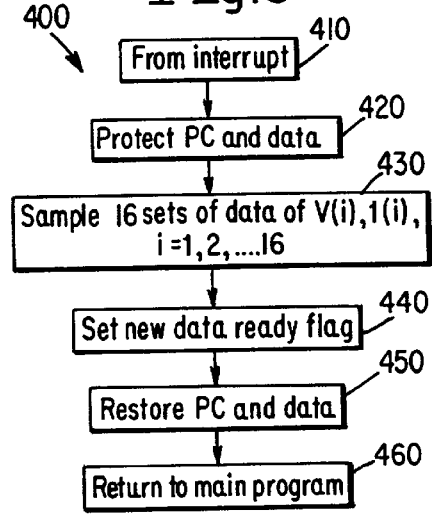

MICRO-PEAK DETECTION QUICK CHARGER

FIELD OF THE INVENTION

This invention relates to a fast battery charger system for 4 to 8-cell NiCd and NiMH batteries for fast charging of the batteries while preventing overcharging of and associated damage to batteries.

BACKGROUND OF THE INVENTION

A fast battery charging system applies high charging current to a battery to minimize charging time. The fast charging process is terminated when the battery reaches its full capacity. It is extremely important for the fast charging system to have means for accurately knowing when the battery is fully charged; otherwise the charger will either overcharge the battery or terminate the charging prematurely. The prior art teaches several methods for terminating fast charging of a battery.

One method is to calculate the number of ampere-hours needed to fully charge the battery. The charging time is measured and charging is terminated when the calculated value is reached. The battery must be discharged completely. In addition, the correct ampere-hour value must be obtained. Any mistake or not fully discharging the battery could cause the battery to be overcharged.

Other methods disclosed in the prior art include the use of negative voltage slope termination and delta peak techniques. When NiCd or NiMH batteries are charged with high current, the voltage will increase with time until it reaches full capacity When the battery reaches full capacity, the voltage reaches a peak, levels out, then starts to decline if charging current is still applied. FIG. 4 shows a typical voltage-time curve of a battery under fast charging. Overcharging the battery will produce oxygen on the battery's negative electrode. This oxygen is consumed by the negative electrode and the battery will heat up. The overcharging causes the battery's voltage to drop from Peak point 620 to Overpeak point 640. The voltage drop signals that the battery is already fully charged.

A slope monitoring technique looks at the battery's voltage-time curve and divides it into several sections according to the voltage change rate. The reflection point in the voltage time curve is used as a basis for stopping the charging of the battery. The reflection point used is the point at which the first voltage derivative peaks. The goal is to stop the fast charging while the voltage of the battery is still increasing. There is not, however, a strong relationship between this reflection point and the point when the battery is fully charged. Further, it is hard to find this reflection point accurately due to the precision of measurement required.

Another slope monitoring technique which can charge different voltage rate batteries uses a logarithmic analog-to-digital converter. A voltage divider is used to scale down the high battery voltage to the 5 volt range. The logarithmic analog-to-digital converter is then used to determine the battery's voltage. The logarithmic analog-to-digital converter is actually an RC charging and discharging timing and comparator network and the accuracy of the voltage measurement is poor.

There are a number of variations of the delta peak method. One method is to use a switched power supply and microcontroller in conjunction with an RC charging and discharging circuit and a comparator which measures the battery voltage. The battery voltage could be as high as 13V during charging. A voltage divider is used to scale down the voltage to the 0–5V range. In order to measure the battery voltage, the charging current must be cut off for short periods of time. The charging process is controlled by measuring the charging voltage continuously or at specific time intervals. The battery's voltage range is predetermined. When the delta peak value is greater than the predetermined value, the fast charging is terminated.

Alternatively, the battery's voltage is not predetermined. The previous voltage measurement is used to determine how to select the divider to scale down the battery's voltage measurement into the desired zone. The fast charging is stopped by the time behavior which indicates charging is completed. The time behavior is monitored by the second order time derivative of the battery's voltage. It is well know that the voltage measurement is subject to noise. Any derivation of a noise contaminated signal will be subject to a very serious noise component. This method is complicated and expensive to manufacture.

Another delta peak method for fast charging termination takes advantage of the fact that the voltage versus time curve of a typical battery under charge is not a smooth, substantially linear waveform. As a result, deviations and fluctuations in the battery's voltage will cause the prior known systems to detect false peak voltages and prematurely terminate fast charging. U.S. Pat. No. 5,177,427 issued to Julian J. Bugaj discloses applying a linear time varying causal equation $Yn=a*Y+b*Y0$, where Yn is the derived battery voltage, "a" and "b" are arbitrary constant coefficients, X is a previously derived battery voltage, and Y0 is the instantaneous battery voltage measurement. This equation is actually just a first order digital filter $Yn=a*Yn-1+b*Xn$, where Yn is the current derived battery's voltage and Xn is the current voltage measurement. It only gets rid of some of the measurement noise. This charging system still uses a voltage divider to scale down the high battery voltage. The capacitor's charging and discharging time is used to measure the battery's voltage, resulting in a poor voltage measurement. This patent also discloses that after a peak has been detected, a counter will start a count of up to five minutes. If there is any increase in the battery's voltage during this time period the counter will reset. If the counter reaches five minutes, the fast charging will be stopped. Stopping the fast charging five minutes after the first delta peak will lead to excessive overcharging.

U.S. Pat. No. 5,557,190 issued to Daniele C. Brotto discloses the use of the falling voltage slope or delta peak charge termination technique with a noise immunity improvement. Noise is particularly troublesome in the flat regions of the voltage-time curve since a momentary drop in voltage due to noise can be misinterpreted as a falling voltage or a negative peak, resulting in premature termination of the charging. The improvement is to disable the voltage slope charge termination technique during times when the signal to noise ratio is comparatively low. In addition, Brotto attempts to improve the signal to noise ratio by reducing the sampling rate during the flat region of the voltage time curve. Since a voltage divider and logarithmic analog-to-digital converter are still used to measure the battery's voltage, the system suffers the same poor accuracy discussed above.

All of the above prior art allows overcharging of batteries under fast charge. Overcharging of a battery will produce oxygen on the battery's positive electrode. This oxygen is then consumed by the negative electrode. The battery heats up, causing the voltage drop which is used by the above methods to stop the charging. At that point, the battery has already been overcharged. Although battery manufacturers design batteries with extra negative electrode material, eventually the overcharging irreversibly consumes the negative electrode and the battery's capacity decreases.

U.S. Pat. No. 5,694,023, issued to Yury M. Porazhansky, discloses a termination technique which does not rely on the use of the delta peak. A charging pulse is applied, providing an average charging current. A first depolarizing discharging pulse is applied, followed by a first rest period. The voltage is measured at a predetermined point during the first rest period. A second depolarizing discharging pulse is applied, followed by a second rest period. Again, the voltage is measured at a predetermined point during the second rest period. The voltage difference between the first and second voltage is calculated. If the resulting difference is greater than a predetermined amount, fast charging is terminated. There are two problems associated with this method. First, this method slows down the charging process since for every charging pulse there will be two discharging pulses and two rest periods. Secondly, the voltage difference between the first and second voltage does not have a strong correlation to a battery being fully charged; rather, it is closely related to the capacity of the battery being charged and the duration of the second discharge pulse.

The prior arts suffer from a number of voltage measurement problems. First, cheap switched power supplies are used which introduces noise to the circuit. This noise will contaminate the batteries voltage, making the voltage measurement inaccurate. Second, 8-bit analog to digital converters are used which have a resolution of 20 mV with a 5V reference. A voltage divider is used to reduce the battery's voltage to the range of the analog to digital converter measurement. If you charge a 9.6V battery for example, the voltage could reach as high as 13V. The battery's voltage needs to be divided by 3 and then feed to the analog to digital converter. The resulting voltage measurement resolution then is actually 60 mV. Further, noise may cause the charger to stop charging prematurely so that the actual delta threshold used by need to be 120 mV. In order to determine when to terminate the fast charge, the delta peak charger must overcharge the battery in order to get the voltage drop. If the resolution is 120 mV, the battery must be overcharged until a 120 mV voltage drop is obtained. This allows significant overcharging of the battery. Third, there is commonly required an interruption to the charging process in order to perform voltage measurement. Fourth, some poor quality or old batteries will produce a false delta peak, causing charging to be prematurely terminated.

SUMMARY OF THE INVENTION

The object of the present invention is to overcome the disadvantages of the prior art by providing a fast battery charging system which uses micropeak detection to avoid overcharging of the battery. It is a further object of the invention to provide a method and apparatus for a fast battery charging system of 4 to 8 cell NiCd and NiMH batteries which is less expensive to manufacture, provides high performance, is highly accurate, reliable and efficient.

The method and system of the present invention includes determining the presence of a battery for charging and converting condition of battery through A/D circuitry. Power to the system is provided from a linear power supply thereby reducing noise into the system. Noise is further reduced by synchronizing the charging circuit and controller with frequency of power supply, as well performing sleeping sampling to overcome noise due to the operation of the CPU. Digital signal processing filter out noise provides a more accurate voltage measurement. Use of a 10-bit A/D converter increases the voltage measurement resolution so that only a small voltage drop, or micro-peak, is required to stop charging. Sensing a battery fully charged state via micropeak detection prevents overcharging and thereby prevents degradation of battery capacity. Further, there is no interruption for voltage measurement, thereby providing a reduction in total charging time. Means are provided to ensure that the battery is fully charged.

BRIEF DESCRIPTION OF THE FIGURES

FIG. 2 is a flow chart depicting the main program flow of the invention charger system;

FIG. 3 is a flow chart depicting the interrupt subroutine program flow of the invention charger system.

DETAILED DESCRIPTION OF THE INVENTION

Figures 1, 4:
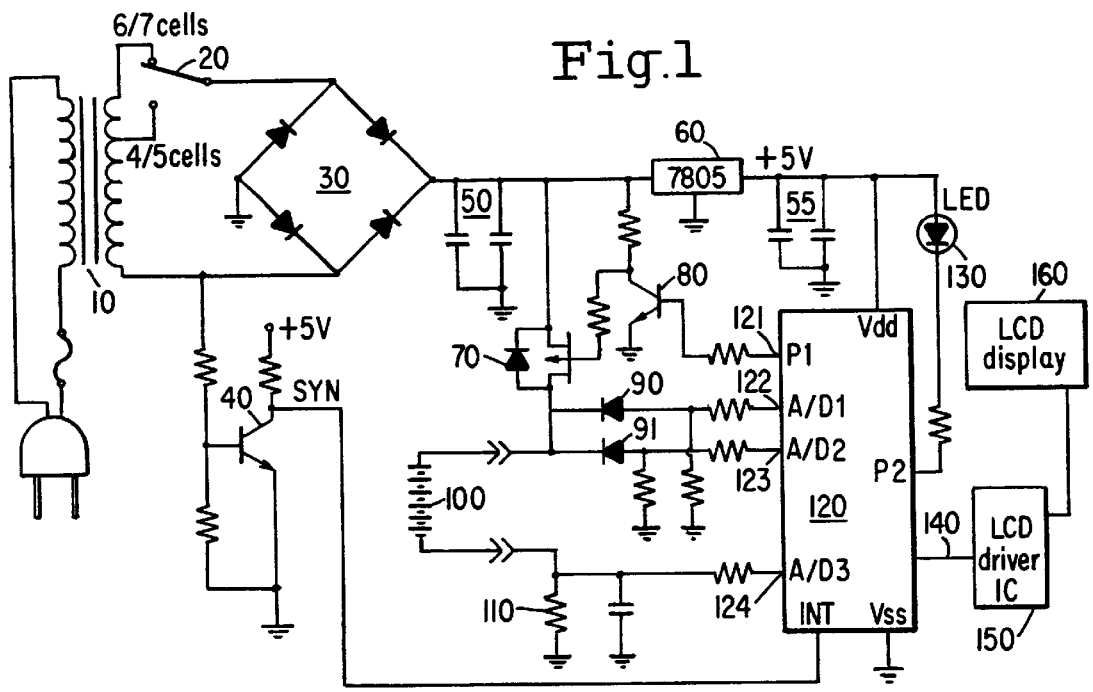
FIG. 1 is a circuit diagram of the micro-peak battery charger system.
FIG. 4 shows a typical voltage-time curve of a battery under fast charging.

An embodiment of the present invention will be described in detail with reference to the accompanying drawings.

In FIG. 1, transformer 10 reduces the high AC voltage to the desired AC voltage. There are two AC outputs of the transformer. The high AC voltage output is for charging a 6 or 7 cell battery; the low AC voltage output is for a 4 or 5 cell battery. Operator uses cell select switch 20 to select either high or low AC voltage for the battery. The bridge 30 rectifies AC to DC. Transistor 40 generates a synchronizing signal the interrupt pin of micro-controller 120 to generate an interrupt for sampling the battery voltage. Capacitors 50 and 55 are power supply filter capacitors. Regulator 60 is a 7805 generating the 5 volts for micro-controller 120. Though not shown, in an alternate embodiment the microcontroller 120 is replaced with a general purpose microprocessor with memory. The use of a microcontroller was primarily chosen since a microcontroller such as the 68HC 11 has built in RAM and ROM for application specific uses, such as the present invention. A further option would be to use an ASIC.

Output 121 of microcontroller 120 turns on or off transistor 80 which in turn switches p-channel power MOSFET 70. Switch 70 turns on and off the charging current. Battery 100 is a NiCd or NiMH battery. Resistor 110 is a 0.1 ohm current sensor, which also acts as a current limiter. Zener diode 90 reduces the battery voltage by 8.5 volts. Zener diode 91 reduces the battery voltage by 4 volts. The resulting voltages are fed to two analog-to-digital converter channel 122 and 123. According to the previously obtained amplitude of the battery voltage, the microcontroller 120 decides which channel to use in calculations. These calculations are discussed below under the description of FIG. 2.

The pilot LED 130 which is driven by output Pin P2 125 is used to indicate charger operation status. A continuous light indicates that the system is charging; a blinking light indicates that the system is in trickle charge mode. Through LCD driver 150 and LCD display 160, the charger system displays the charging current and the battery voltage alternately, with updating every half second. The communication between the microcontroller 120 and the LCD driver 150 is conducted by means of serial communication line 140.

FIG. 2 depicts the main program flow 200 of the invention charger system. After initialization 205 of program parameters, a test 210 is performed to determine if a battery is connected to the charger. The micro-controller 120 turns on the switch 70 for 10 ms each second. During the 10 ms, the micro-controller 120 measures the current using A/D3 124 m and current sensor resistor 110. A zero current indicates no battery present and monitoring for battery present continues. A nonzero current indicates that a battery is connected to the charger. Once a battery connection is detected, the charging process and timing 220 begins. During the charging process, a synchronizing signal will interrupt the main program 200 to measure the battery voltage. The interrupt subroutine program flowchart is shown in FIG. 3.

After interrupt 410, the system enters Protect PC and Data mode 420. Next the micro-controller 120 samples and stores 430 sixteen sample sets of voltage and current data, V'(i) and I(i), where i=1,2, . . . ,16. Once the new values are ready, a flag is set 440 to inform the main program that the new data are available. The system enters Restore PC and Data mode. Control is then returned 460 to the main program 200.

The main program 200 determines that new sample data are available 230 and then performs calculation 240 using the equation V'(i)=V(i)−0.1*I(i), where 0.1 is the current sensor resistor 110 value. A special digital filter 250 then filters out noise. The filter is a sorting and averaging algorithm. It sorts the V'(i) into an order, then gets rid of the four largest and four smallest data. The remaining eight data samples are added together, then divided by 8. Next 8.5V or 4.0V is added to form the battery voltage.

A special case is considered. If the filter capacitor 50 is not large enough and the battery voltage is very high, the charging current will turn to zero. In this special case, the micro-controller averages all of the voltage sample data V(i) if the l(i) is zero, to get the battery voltage. There is a predetermined current limit of 5.5 A in the charger system. If the micro-controller measures a current greater than 5.5 A, it will stop the fast charging. This prevents using the high voltage intended for charging 6 or 7 cell batteries from being used to charge 4 or 5 cell batteries.

After main program 200 obtains the new battery voltage, it calculates the voltage change rate. The delta peak threshold and the voltage no increase timer limit 260 are updated. The current battery voltage is compared to the previous value 270. If the battery voltage has increased, the current battery voltage replaces the maximum voltage value and clears the voltage no increase timer 275. If the battery voltage does not increase, the voltage no increase time value is increased by 1 at step 280. If the voltage no increase timer is greater than the updated timer limit, it stops the fast charging process at Micropeak stop point 630, FIG. 4. The current voltage is compared to the maximum voltage record. If the voltage drop is greater then its updated threshold and the charging time is greater than three minutes, fast charging is stopped. If the delta peak occurs within three minutes, a check is performed to ensure that the battery is really fully charged. The delta peak threshold and the voltage no increase time limit are updated every 30 seconds according to the battery voltage, the battery voltage change rate and the total charging time. The maximum delta peak threshold is 80V and is gradually reduced to 5 mV. The maximum voltage no increase limit is 100 seconds and is gradually reduced to 20 seconds. There are two safety timers in the charger to improve the safety of the charger. The first safety timer is the fast charging timer. It sets the maximum fast charging time to 40 minutes. If it has not detected the delta peak in 40 minutes, it will stop fast charging. The second safety timer is the "unattended" timer. If the charger is unattended for more than 120 minutes, the charger will automatically shut down.

Many modifications and variations of the present invention are possible in light of the above teachings. It is, therefore, to be understood within the scope of the appended claims the invention may be protected otherwise than as specifically described.

We claim:

1. A battery charging circuit and controller with a fast cycle charge comprising:

a microcontroller including an A/D conversion circuit for sampling a present condition of at least one battery;

a linear power supply providing power to said charging circuit for charging said at least one battery;

said battery charging circuit and controller synchronizes with the frequency of said power supply, and said A/D conversion circuit having a sampling resolution of down to 5 mV.

2. The battery charging circuit and controller as recited in claim 1, wherein said microcontroller can operate in a sleep mode.

3. The battery charging circuit and controller as recited in claim 1, wherein said A/D converter operable while said microcontroller is in a sleep mode.

4. The battery charging circuit and controller as recited in claim 1, wherein said A/D converter is a 10 bit converter.

5. The battery charging circuit and controller as recited in claim 1, wherein said circuit performs a subtractive process to provide appropriate voltage measurement values to said microcontroller.

6. The battery charging circuit and controller as recited in claim 1, wherein said controller provides digital signal processing functionality.

7. The battery charging circuit and controller as recited in claim 6, wherein said digital signal processing system provides digital filtration operation to remove noise.

8. The battery charging circuit and controller as recited in claim 1, wherein said controller is a microprocessor.

9. The battery charging circuit and controller as recited in claim 1, wherein said controller is an ASIC.

10. A method for fast cycle charging using battery charging circuit and controller comprising:

sampling a present condition of at least one battery with a microcontroller;

converting said condition of at least one battery through A/D circuitry;

providing power from a linear power supply to said charging circuit for charging said at least one battery;

synchronizing said battery charging circuit and controller with the frequency of said power supply; and sampling with said A/D conversion circuitry with a resolution of down to 5 mV.

11. A method for fast cycle charging using battery charging circuit and controller comprising 10, wherein said microcontroller is operated in a sleep mode.

12. A method for fast cycle charging using battery charging circuit and controller comprising 10, wherein said A/D conversion is operable while said microcontroller is in a sleep mode.

13. A method for fast cycle charging using battery charging circuit and controller comprising 10, wherein said A/D conversion is a 10 bit conversion.

14. A method for fast cycle charging using battery charging circuit and controller comprising 10, wherein said sampling includes a subtractive process to determine voltage measurements.

15. A method for fast cycle charging using battery charging circuit and controller comprising 10, wherein said controller provides digital signal processing functionality.

16. A method for fast cycle charging using battery charging circuit and controller comprising 15, wherein said digital signal processing system provides digital filtration operation to remove noise.

\* \* \* \* \*